US011329970B2

(12) United States Patent
Gosalia

(10) Patent No.: US 11,329,970 B2
(45) Date of Patent: May 10, 2022

(54) SHARING AUTHENTICATION BETWEEN APPLICATIONS

(71) Applicant: PAYPAL, INC., San Jose, CA (US)

(72) Inventor: Jigar Rajnikant Gosalia, Fremont, CA (US)

(73) Assignee: PAYPAL, INC., San Jose, CA (US)

( * ) Notice: Subject to any disclaimer, the term of this patent is extended or adjusted under 35 U.S.C. 154(b) by 369 days.

(21) Appl. No.: 16/449,092

(22) Filed: Jun. 21, 2019

(65) Prior Publication Data
US 2020/0403986 A1 Dec. 24, 2020

(51) Int. Cl.
H04L 29/06 (2006.01)
G06F 3/0484 (2013.01)
G06F 9/54 (2006.01)

(52) U.S. Cl.
CPC ........ H04L 63/0815 (2013.01); G06F 3/0484 (2013.01); G06F 9/54 (2013.01); H04L 63/0428 (2013.01); H04L 63/0853 (2013.01)

(58) Field of Classification Search
CPC ............ H04L 63/0815; H04L 63/0428; H04L 63/0853; G06F 3/0484; G06F 9/54; G06F 2221/2145; G06F 21/41; H04W 12/06
See application file for complete search history.

(56) References Cited

U.S. PATENT DOCUMENTS

| 10,097,538 | B1* | 10/2018 | Sanchez | G06F 21/44 |
| 10,853,470 | B2* | 12/2020 | Sankaranarasimhan | G06F 9/44505 |
| 2016/0006719 | A1* | 1/2016 | Khalil | H04L 63/0815 726/8 |
| 2017/0223019 | A1* | 8/2017 | Seibert, Jr. | H04L 63/0815 |
| 2018/0077142 | A1* | 3/2018 | Thakkar | H04L 9/3213 |

* cited by examiner

Primary Examiner — Beemnet W Dada
(74) Attorney, Agent, or Firm — Haynes and Boone, LLP

(57) ABSTRACT

Systems and methods for sharing authentication between applications include receiving a request to share authentication from a first application with a second application. An account identifier and identity token for a user are obtained from the first application. Access to a communication application associated with the account identifier is verified as available. The account identifier and identity token are sent to a second application server for verification with a first application server. A verification message is received in the communication application from the second application server. The verification message is determined to contain confirmation information and authentication is shared from the first application with the second application. Related systems and methods include retrieving information associated with an operating system to facilitate sharing authentication between applications.

20 Claims, 9 Drawing Sheets

503 johndoe@email.com
janedoe@email.com (telephone number)

535

520

504 johndoe@email.com
janedoe@email.com (telephone number)
johndoe@email.com
janedoe@email.com

535

520

602 johndoe@email.com
janedoe@email.com (telephone number)

603 johndoe@email.com
janedoe@email.com
(telephone number)

(telephone number)
johndoe@email.com
janedoe@email.com

SHARING AUTHENTICATION BETWEEN APPLICATIONS

TECHNICAL FIELD

The present disclosure generally relates to computer security and more particularly to sharing authentication between device applications according to various embodiments.

BACKGROUND

Authentication techniques are generally used to verify the identity of a user as a control measure for access to devices, device applications, user accounts, restricted content, and various other protected resources. With the increasing prevalence of smart devices and the numerous applications that are typically installed thereon, one is required to remember many usernames, passwords, and other authentication credentials to authenticate oneself for access to the numerous applications. Remembering the numerous authentication credentials for each application is burdensome for users and a waste of computing resources. Thus, there is a need for an improvement in the field of authentication and computer security related technology.

Figure 1:
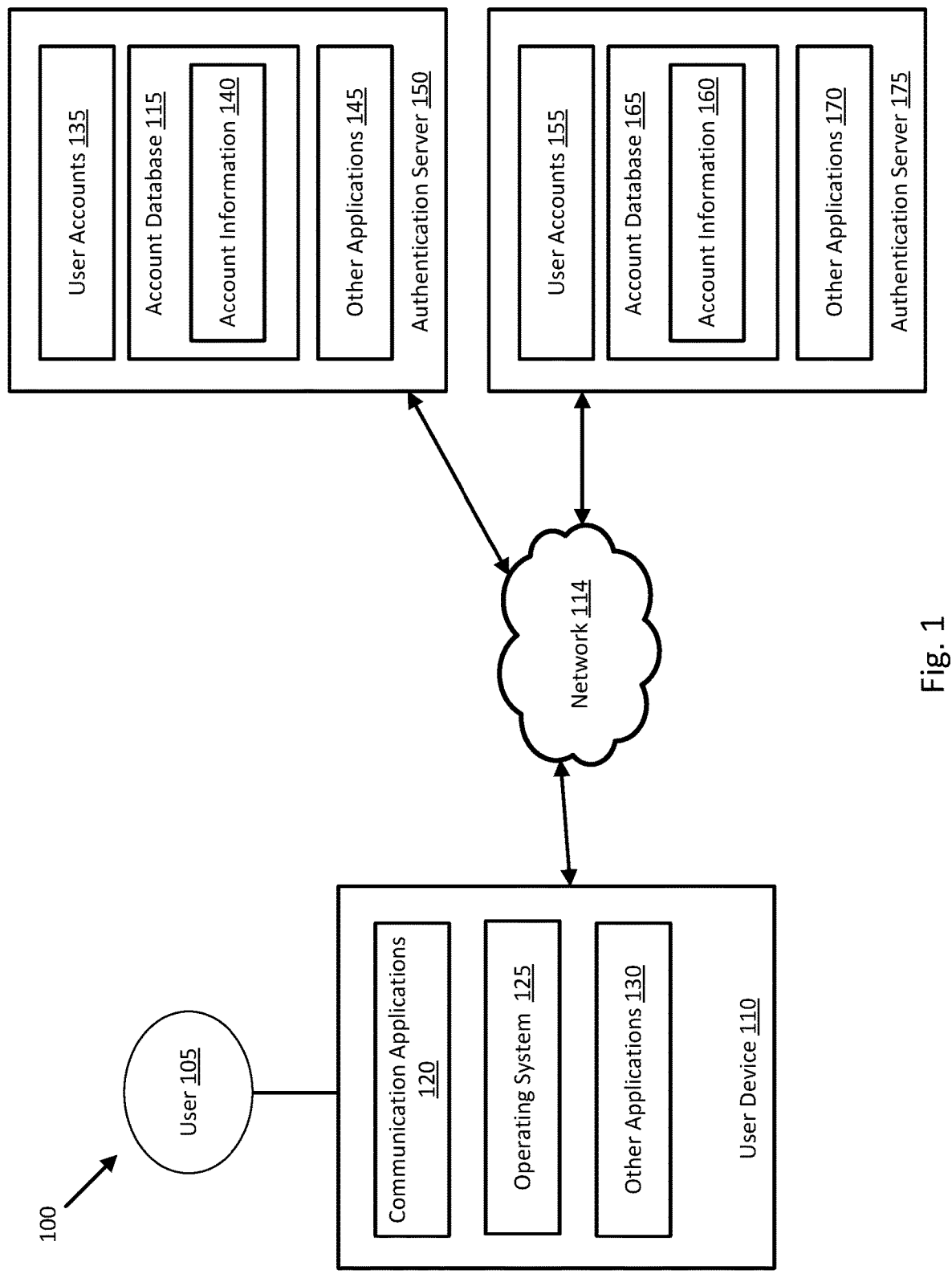
FIG. 1 illustrates a block diagram of a networked system suitable for implementing one or more embodiments of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more embodiments. In one or more instances, structures and components are shown in block diagram form in order to avoid obscuring the concepts of the subject technology. One or more embodiments of the subject disclosure are illustrated by and/or described in connection with one or more figures and are set forth in the claims.

Computing devices, such as smart phones or computing tablets, generally have software applications installed thereon designed to perform functions, tasks, or activities for the benefit of a user. Several of the applications may require that the user authenticate herself/himself before access to the resources of the application is granted. Once the user has authenticated herself/himself, the application may determine whether the user is authorized to access one or more resources of the application. As new applications are installed on the computing device, the authentication and authorization approaches of prior systems become burdensome and inconvenient for users as each new application requires establishing authentication credentials and configuring authorization rights. In addition, storing such credentials and configurations for each application uses up valuable computing system resources. The present disclosure describes improved systems and methods for securely sharing user authentication and authorization between applications of computing devices.

In various embodiments, a request to share an authentication for a first application with a second application is received. For example, a user may perform an action on a graphical user interface (GUI) of a user device to request that the first application share authentication with the second application. In some cases, such an action may be moving a graphical icon of the first application toward a graphical icon of the second application in the display of the user device. Various embodiments include obtaining an account identifier (e.g., email address, telephone number, or other login handler) associated with the first application authentication and an encrypted identity token corresponding to an account of the user for the first application. Access to communications associated with the account identifiers may be verified on a third application. For example, emails corresponding to an email address are verified to be accessible on an email application of the user device. As another example, text messages corresponding to a telephone number are verified to be accessible on a text messaging application of the user device. In response to the verification that communications are accessible, the account identifier and the encrypted identity token may be sent to a service provider server of the second application (e.g., second application server). The second application sever may communicate with a service provider server of the first application (e.g., first application server) to verify that the account identifier and encrypted identity token received by the second application server match an existing account associated with the first application. Upon receiving a verification from the first application server verifying that the account identifier and the encrypted identity token match existing account information associated with the first application, the second application server may direct a verification message to the account identifier. For example, if the account identifier is an email address, the second application server may cause a verification email to be sent to the email address. If the account identifier is a telephone number, the server of the second application may cause a verification text message or a voice message to be sent to the telephone number. In some embodiments, the third application associated with the account identifier is searched to determine if the verification message has been received. If the verification message is found in the third application, the verification message may be analyzed (e.g., parsed) to determine if it contains the account identifier and/or identity token. In some embodiments, a confirmation action may be received by the user indicating that the verification message is correct (e.g., web link selection indicating user confirmation). If the verification message is determined to contain the account identifier and/or identity token, authentication from the first application may be shared with the second application. The authentication may authorize the user to access the second application using the authentication of the user for the first application.

As an illustrative example, a user may perform an initial authentication to access her/his user device (e.g., biometric input, PIN, password, passcode). With the initial authentication, an operating system of the user device may identify the user as a registered user of the user device. The user device may have a first application with first authentication credentials registered thereto. The user device may have a second application with second authentication credentials registered thereto. The user may want to authenticate herself/himself for access to the second application using the first authentication credentials registered to the first application. Using various embodiments, the first authentication credentials of the user for the first application may be shared with the second application. Sharing the authentication authorizes the user to access the second application using the first authentication credentials of the first application. In several embodiments, the user does not need to enter a biometric, PIN, password and the like to access the second application after first authentication credentials have been shared as the operating system and a first application server have already verified the identity of the user at the initial authentication and during the authentication sharing process, respectively. As such, the user may simply provide the second application with an account identifier to authenticate herself/himself to access the second application (e.g., accounts registered on the second application).

Using various embodiments, users of a shared device may share authentication and authorization between applications to conveniently allow access (or limited access) to various accounts registered to the applications. For example, two or more users (e.g., a couple, family members, friends, etc.) may share a user device. A first user may have installed on the user device a first application associated with a first service provider. The first user may have set up an authentication profile for the first application. A second user may have installed on the user device a second application associated with a second service provider. The second user may have set up an authentication profile for the second application. The first user may wish to provide limited access to the second user to view account information in the first application. However, the first user may not want to share her/his password with the second user to give the second user access to the account information on the first application. Thus, the first user, using various embodiments described herein, may share the authentication profile registered to the second application with the first application. After the authentication profile has been shared, the second user may use the authentication profile set up with the second application to access the first application. In some embodiments, the permissions of users whose authentication profiles were shared will be limited. For example, the first user may configure the first application to only authorize limited access to users whose shared authentication is being used to access the first application.

In the above example, because the second user is using shared authentication to access the first application, the second user's access may be limited. In some cases, access may be limited to view-only permission for the user or to certain content using the shared authentication. In other cases, access may be unlimited for the user using the shared authentication. In some embodiments, the operating system prompts the user for authorization/permissions to couple to each of the shared authentications. For example, if a user makes a request to share an authentication of the first application with the second application, the operating system prompts the user to provide access permissions for the authentication after is has been shared to the second application. The operating system may prompt the user based on permissions available on the second application. The operating system may further communicate the permissions to the second application during the sharing authentication process. In this regard, when the shared authentication is used as an authentication on the second application, permissions for a user using the shared authentication may be limited according to what the user provided in the prompt.

In some embodiments, authentication is shared bilaterally between applications. For example, a user may perform an action in a GUI of a user device such as moving two applications toward each other, which may initiate bilateral sharing between the two applications.

In various embodiments, sharing authentication between applications may facilitate sharing authorization to transfer funds between accounts in the applications. For example, when authentication is shared (e.g., unilaterally or bilaterally), a user may be presented with a field to enter an amount to transfer as well as a field to enter account information for directing the transfer. In some embodiments, payor or payee account details may be shared between applications along with authentication and authorization.

According to some embodiments, an operating system and applications, between which authentication is shared, contribute identifying information for a user to further verify the identity of the user at various operations in the present disclosure. For example, the operating system may contribute authentication information related to an initial authentication. For example, the applications may contribute respective user profile information for the user as well as authentication profile information for the user. In some embodiments, an application server for the respective applications may use machine learning techniques to efficiently narrow down verification. For example, a first application server may have stored in a database associated with the first application server information related to a service provider of a second application server. To illustrate, a first financial institution server may have information about an account of a user that relates to a second financial institution (e.g., payee information of a bill, credit card, etc.). The first financial institution server may use such information to narrow down information that is communicated to the second financial institution server to efficiently verify the users for authentication sharing.

Referring now to FIG. 1, a block diagram of a networked system 100 configured to share authentication between applications in accordance with one or more embodiments of the present disclosure is illustrated. System 100 includes a network 114, a user device 110, an authentication server 150, and an authentication server 175. In some cases, authentication server 150 or 175 may be maintained by a service provider, such as PayPal, Inc. of San Jose, Calif. A user 105 is associated with user device 110, where user 105 can provide an authentication input to user device 110. User device 110 may receive an action performed in a GUI of user device 110 by user 105. In some embodiments, one or more of the depicted components of system 100 may include a plurality of the depicted components.

Network 114 may be implemented as a single network or a combination of multiple networks. For example, in various embodiments, network 114 may include the Internet or one or more intranets, landline networks, and/or other appropriate types of networks.

User device 110, authentication server 150, and authentication server 175 may each include one or more processors, memories, and other appropriate components for executing instructions such as program code and/or data stored on one or more computer-readable mediums to implement the various applications, data, and steps described herein. For example, such instructions may be stored in one or more computer-readable media such as memories or data storage devices internal and/or external to various components of system 100, and/or accessible over a network 114. Each of the memories may be non-transitory memory.

User device 110 may be implemented using any appropriate hardware and software configured for wired and/or wireless communication over network 114. For example, in some embodiments, user device 110 may be implemented as a personal computer (PC), a mobile phone, personal digital assistant (PDA), laptop computer, tablet computer, and/or other types of computing devices capable of transmitting and/or receiving data.

User device 110 may include one or more communication applications 120 which may be used, for example, to provide a convenient interface to facilitate communicating information over network 114. The communications applications 120 may include email, texting, voice, and instant messaging applications that allow user 105 to send and receive emails, calls, and texts through network 114, as well as applications that enable the user to communicate to authentication server 150 and 175. User device 110 also includes operating system 125, which may be used to provide client-side processing for performing desired tasks in response to operations selected by user 105. In one embodiment, the operating system 125 may have access to communication applications 120 to scan and/or search received communications. In some embodiments, the operating system may not have direct access to the communication applications 120 but may have access indirectly through communications with another user device. For example, operating system 125 of user device 110 may communicate with an operating system of another device to access such communication applications of the other device. Such communication applications of the other device may facilitate sharing authentication in various embodiments. In some cases, the devices may be linked to each other as devices under the same service provider plan, on the same network (e.g., Wi-Fi network, network 114), and/or connected via Bluetooth. For example, the user device 110 may not have access to an email address (e.g., "janedoe@email.com"), however another user device on the same service provider plan or network may have access to the email address on an email application. User device 110 may communicate with the other device to access the email address in the email application.

In some embodiments, an account identifier may be used by authentication server 150 or 175 to associate user 105 with a particular account maintained by a service provider of authentication server 150 or 175. The communications applications 120 may send/receive communications associated with the account identifiers. For example, the account identifiers may include email addresses, telephone numbers, instant messaging handles, and other appropriate account identifiers where user 105 may receive electronic communications from authentication server 150 or 175.

User device 110 may further include other applications in particular embodiments to provide desired features to user device 110. For example, the other applications may include an application interface to facilitate sharing authentication between applications, security applications for implementing client-side security features, programming client applications for interfacing with appropriate application programming interfaces (APIs) over network 114, or other types of applications. In some cases, the APIs may correspond to authentication servers 150 and 175, which may allow user device 110 to interface with authentication server 150 and 175. User device 110 may also include a security application configured to encrypt and/or decrypt data to provide secured communication and transfer of data.

Authentication server 150 may be maintained, for example, by an online service provider which may provide authentication and authorization services. In some cases, authentication server 150 may be maintained, for example, by an online payment service provider which may provide payment services to user 105. In this regard, authentication server 150 includes one or more verification applications which may be configured to interact with user device 110 over network 114 to facilitate sharing authentication between applications.

Authentication server 150 maintains user accounts 135, each of which may include account information 140 associated with individual users. For example, account information 140 may include account identifiers for accounts 135 (e.g., email addresses, telephone numbers, etc.) and their respective identity tokens, private information of users such as account numbers, passwords, device identifiers, user names, addresses, phone numbers, credit card information, bank information, PINs, or other sensitive information which may be used to facilitate sharing authentication between applications.

Authentication server 150 may include an account database 115 to store the account information 140. Account database 115 may also store verification details from completed verification requests. Account database 115 may also store authentication details from completed authentication requests. Such information may also be stored in a third-party database accessible by authentication server 150.

Authentication server 150 includes other applications 145, such as a verification application, which may be configured to receive information from user device 110 to facilitate sharing authentication between applications of user device 110. The verification application may include one or more applications to process a request from authentication server 175 or other authentication servers to verify a user as described herein. As such, the verification application may store details of the verification request. Authentication server 150 may also include a security application configured to encrypt and/or decrypt data to provide secured communication and transfer of data.

The description of authentication server 150 may generally be applied to authentication server 175, user account 155, account information 160, account database 165, and other applications 170.

Figure 2:
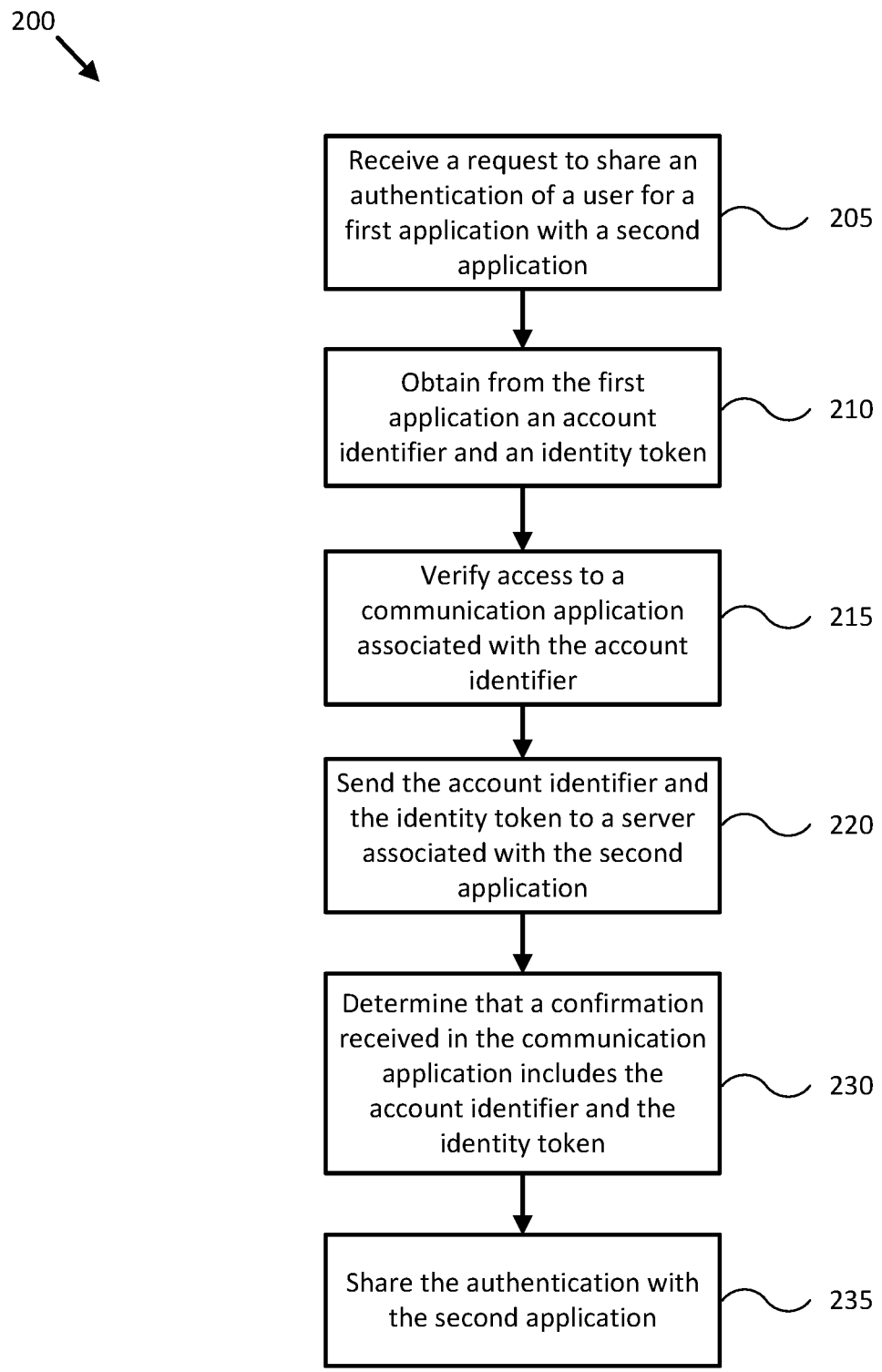
FIG. 2 illustrates a flow diagram of a process for sharing authentication between applications in accordance with one or more embodiments of the present disclosure.

FIG. 2 illustrates a flow diagram of a process 200 for sharing authentication (e.g., authentication profile) between applications in accordance with one or more embodiments of the present disclosure. For explanatory purposes, process 200 is primarily described herein with reference to FIG. 1; however, process 200 is not limited to FIG. 1. The blocks of process 200 are described herein as occurring in serial, or linearly (e.g., one after another). However, multiple blocks of process 200 may occur in parallel. In addition, the blocks of process 200 need not be performed in the order shown and/or one or more of the blocks of process 200 need not be performed.

In some embodiments, a user may establish an initial authentication with an operating system of a user device to gain access to the user device. The initial authentication may include prompting the user to enter a password, PIN, passcode, and/or biometric data to gain access to the user device. For example, the user device may be in a hibernate or sleep mode, and when the user interacts with the user device to bring the user device out of the hibernate or sleep mode, the user device may proceed with an initial authentication.

Prior to sharing authentication between a first application and a second application, user 105 may establish an authentication profile for a first application. For example, user 105 may use an account identifier in conjunction with a password, PIN, biometric data, and the like to authenticate herself/himself to gain access to the first application or an account on the first application. The operating system verifies the user's identity at the initial authentication. In some embodiments, the first application shares the authentication information, established for the first application, with the operating system. Other applications may share their respective authentication information, including authentication profiles, with the operating system to facilitate sharing authentication between application as described herein.

At block 205, the operating system of the user device receives the request to share an authentication profile of the user for the first application with a second application. For example, the request may be to share an authentication profile of the user for a social media application with a travel application, to share an authentication profile of the user for a banking application with another banking application, or to share an authentication profile of an entertainment application with a payment services application. In this regard, sharing application authentication may be implemented in various ways for various applications that require a form of authentication. In some embodiments, the user may have a number of applications installed on the user device. Some of the applications may require user authentication before access to the application or an account in the application is granted. The user may desire a secure and efficient way to share an authentication profile established on a first application with several of the other applications such that the user can conveniently access the several other applications using the authentication profile existing in the first application. As such, the user may perform an action on the user device to indicate that the user wants to share the authentication profile existing in the first application.

In some embodiments, the action performed may be in a GUI of the user device and may be determined to match an action corresponding to a request to share an authentication profile of the user for the first application with a second application. For example, the operating system may recognize that the user has moved (e.g., dragged) an icon representing the first application to overlap an icon representing the second application, which indicates that the user wants to share an authentication profile of the first application with the second application. As another example, the operating system may recognize that the user has moved an icon of the first application in a direction toward the second application. The operating system may then prompt the user for an authentication profile of the first application that she/he wants to share with the second application. In an aspect, the GUI of the operating system may display an interface over an icon of the first application for the user to select which authentication profile(s) she/he wishes to share with the second application. In one embodiment, the operating system may request the user confirm the authentication sharing request, such that inadvertent actions, such as the user simply wanting to move an icon to a different location, do not result in unintended authentication sharing.

At block 210, the operating system obtains from the first application an account identifier and an encrypted identity token. For example, the account identifier may be an email address, telephone number, instant messaging handle or other identifier of an authentication profile of the first application. The account identifier may be associated with a communication application such that electronic communications (e.g., messages) may be received using the account identifier. For example, the communication application may be an email application and the account identifier may be an email address. As such, emails directed to the email address may be received and viewed in the email application. As another example, the communication application may be a text messaging application and the account identifier may be a telephone number. As such, text messages directed to the telephone number may be received and viewed in the text messaging application. As a further example, the communication application may be an instant messaging application and the account identifier may be a messenger handle or telephone number, and messages directed to the messenger handle or telephone number may be received and viewed in the instant messaging application.

In some embodiments, the identity token may be an encrypted identity token generated and encrypted by the first application. For example, the identity token may contain user profile information such as a user's name, birthdate, address, email, security picture, and/or other information related to authentication of the user. In various embodiments, the first application provides the identity token to the operating system and the operating system encrypts the identity token.

At block 215, the operating system verifies that it has access to a communication application associated with the account identifier obtained in block 210. For example, if the account identifier is an email address, the operating system verifies that the operating system has access to an email application associated with the email address. As another example, if the account identifier is a telephone number, the operating system verifies that the operating system has access to a text messaging application or a voice communicating application associated with the telephone number. In further examples, the account identifier may be a messenger handle and the operating system verifies that the operating system has access to the messaging application associated with the messenger handler. In some cases, access to the communication application may include the ability to request information (e.g., electronic messages and content thereof) from the communication application. In other cases, access to the communication application may include the ability to read, search, scan, copy, edit, delete, share, and/or create new information from, within, and/or using the communication application. In various embodiments, the user provides access to the operating system to access the communication application upon installation of the communication application or within user preferences of the communication application.

At block 220, the operating system communicates the account identifier and the encrypted identity token to a second application server. In various embodiments, more than one account identifier and respective encrypted identity tokens may be communicated to the second application server. For example, a user may have numerous authentication profiles in the first application corresponding to the different account identifiers and the user may want to share one or more of the numerous authentication profiles from the first application with the second application.

In some embodiments, the operating system may communicate the account identifier and the encrypted identity token to the second application server via a network interface. In some cases, the operating system uses access to the one or more communication applications of the user device, as described above, to communicate with servers of the user device applications. For example, the operating system may use the email application to send an email containing the account identifier and the encrypted identity token to an email address controlled by a second application server. In another example, the operating system may use the text messaging application to send a text message containing the account identifier and the encrypted identity token to a telephone number controlled by the second application server.

In various embodiments, the second application server receives the account identifier and the encrypted identity token from the operating system of the user device. For example, the server may receive the account identifier and the encrypted identity token over a network channel. For example, the server may receive the account identifier and the encrypted identity token via a communication application, such as an email application, text messaging application, or other network interface.

Upon receiving the account identifier and encrypted identity token, the second application server may communicate the received account identifier and the encrypted identity token to a first application server in a verification request. In some embodiments, the first application server may decrypt the encrypted identity token and verify that the account identifier and the respective information from the decrypted identity token are valid according to account information of the user. For example, the first application server may verify that the account information corresponding to the account identifier matches the decrypted information of the identity token. After account identifiers and information from the respective identity tokens have been verified by the first application server, the first application server may communicate the verification to the second application server.

In some embodiments, the second application server may receive the verification from the first application server. The verification may indicate that the account identifier and information encrypted in the identity token are valid for the user. In response to receiving the verification, the second application server communicates (e.g., sends) a verification/confirmation communicate (e.g., message, notification) to the account identifier.

At block 230, the operating system determines whether a confirmation message has been received in the communication application to which it has access. If the confirmation has been received in the communication application, the operating system further determines whether the confirmation includes verification information from the second application server. For example, the operating system may determine that the account identifier and the encrypted identity token that was previously sent to the second application server are contained in the confirmation. For example, the operating system may determine that the account identifier and the encrypted identity token along with a verification token from the server of the first application have been received. The account identifier and/or the identity token may be compared against what was obtained from the first application at block 210, respectively, to verify there is a match. Additionally, the operating system may obtain a verification token from the first application to compare against the verification token received from the second application server to verify that the first application server verified the account identifier and identity token received from the second application server. In some embodiments, the verification token may be a unique token stored as a node or record in a system of servers (e.g., a public, private, or hybrid cloud). In some case, the verification may be a block in a blockchain.

At block 235, authentication is shared by the first application with the second application. The authentication may be shared in response to the operating system determining that the confirmation received at block 230 contains the account identifier, the encrypted identity token, and/or the verification token. The authentication may be shared further in response to the initial authentication of the user for use of the user device. Sharing authentication may authorize the user to access the second application (e.g., accounts registered thereto) using the authentication already established with the first application.

In some embodiments, after a first application has shared user authentication with a second application, a user may start (e.g., open) the second application and the second application may prompt the user for an account identifier to use to authenticate the user. The second application may list account identifiers that may be used as authentication profiles for the user. The list may include account identifier(s) established on the second application and account identifier(s) that have been shared with the second application by the first (or other) applications. For example, the user may use an email address and password to authenticate herself/himself to access the first application. After the first application has shared authentication with the second application, the user may authenticate herself/himself to access the second application using the email address established as part of the authentication profile of the first application. In some embodiments, the user need only provide the email address (without an associated password) to access the second application as both the server of the first application and the operating system of the user device have authenticated the user. In some cases, a telephone number or messenger handle may be used instead of the email address.

Figure 3:
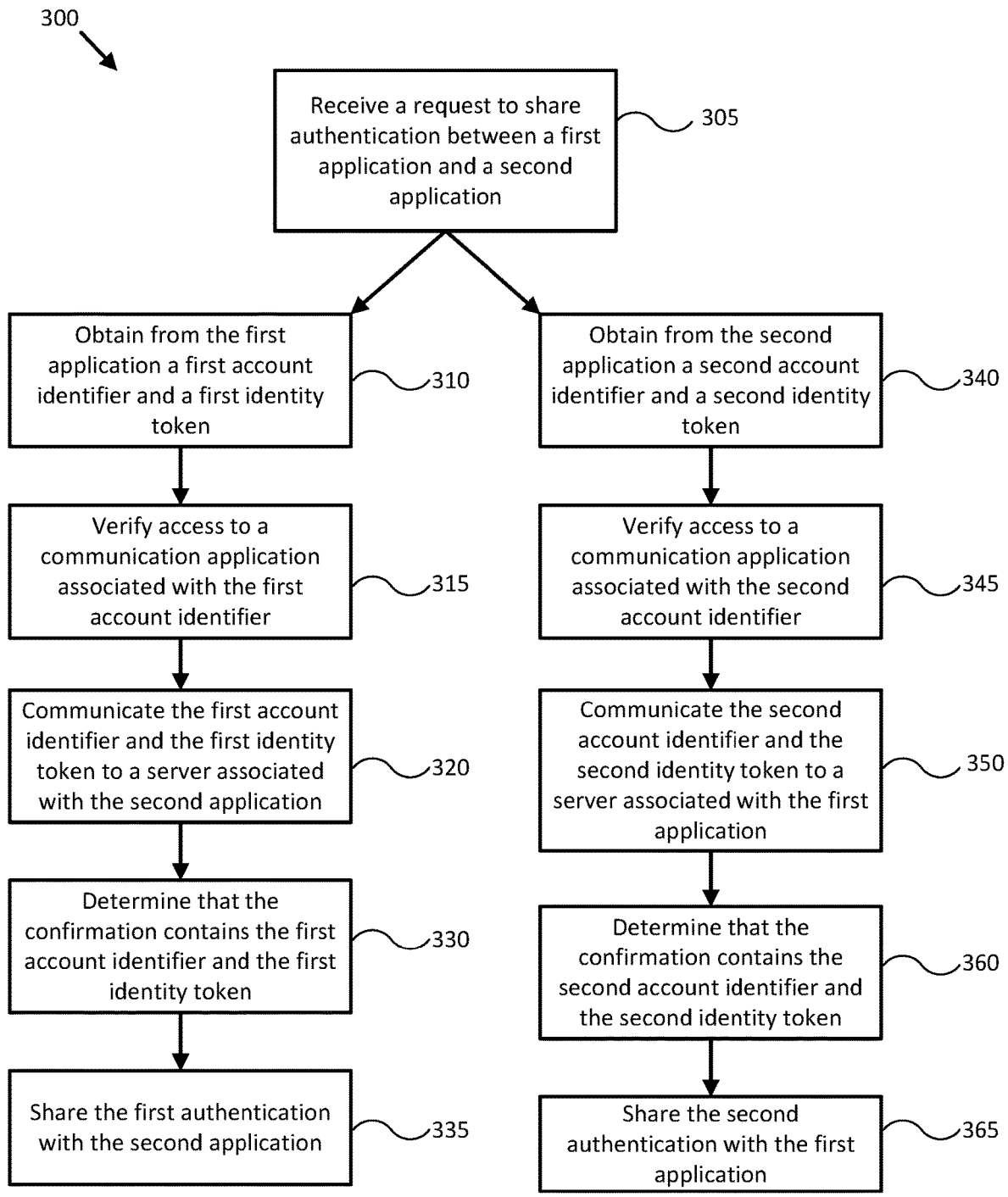
FIG. 3 illustrates a flow diagram of a process for bilaterally sharing authentication between applications in accordance with one or more embodiments of the present disclosure.

FIG. 3 illustrates a flow diagram of a process 300 for bilaterally sharing authentication between applications in accordance with one or more embodiments of the present disclosure. Process 300 is similar to process 200 in that process 300 includes a first application sharing authentication with a second application, however, process 300 also includes the second application sharing authentication with the first application. As such, process 300 involves bilateral sharing of authentications between applications. Furthermore, the description of the various components/blocks of FIG. 2 may generally be applied to FIG. 3. The blocks of process 300 are described herein as occurring in serial, or linearly (e.g., one after another). However, multiple blocks of process 300 may occur in parallel. In addition, the blocks of process 300 need not be performed in the order shown and/or one or more of the blocks of process 300 need not be performed.

In some embodiments, a user may establish an initial authentication with an operating system of a user device to gain access to the user device. The initial authentication may include prompting the user to enter a password, PIN, and/or biometric data to gain access to the user device. For example, the user device may be in a hibernate or sleep mode, and when the user interacts with the user device to bring the user device out of the hibernate or sleep mode, the user device may proceed with the initial authentication. Once the user has authenticated herself/himself at the initial authentication, the operating system has verified the user's identity for access to use of the user device. This initial authentication may be a basis for further authentication to use applications as described herein.

Prior to sharing authentication between a first application and a second application, a user may establish an authentication profile for the first application and an authentication profile for the second application. For example, the user may use an account identifier in conjunction with a password, PIN, biometric data, and the like to authenticate herself/himself to gain access to the first application or an account on the first application. Likewise, the user may use an account identifier in conjunction with a password, PIN, biometric data, and the like to authenticate herself/himself to gain access to the second application or an account on the second application. In some embodiments, the first application shares the authentication profile, established for the first application, with the operating system. Similarly, in some embodiments, the second application shares the authentication profile, established for the second application, with the operating system.

At block 305, the operating system of the user device receives a request to bilaterally share (a) one or more authentication profiles of the first application with a second application and (b) one or more authentication profiles of the second application with the first application. For example, the request may be to bilaterally share an authentication profile of the user for a social media application and an authentication profile of the user for a financial services application, to bilaterally share an authentication profile of the user for a travel application and an authentication profile of a mobile banking application, or to bilaterally share an authentication profile of an entertainment application and an authentication profile of a shopping application.

In some embodiments, an action performed in a GUI of the user device may be determined to match an action corresponding to the request to bilaterally share authentication profiles between applications. For example, the operating system may recognize that the user has moved (e.g., dragged) an icon of the first application and an icon of the second application toward each other, which indicates that the user wants to bilaterally share authentication profiles between the first application and the second application. In one embodiment, the operating system may request the user confirm the authentication sharing request, such that inadvertent actions do not result in unintended authentication sharing. As another example, the operating system may recognize that the user has selected an option in the GUI indicating that the user requests bilaterally sharing between two or more indicated applications. In some embodiments, the operating system prompts the user for authentication profiles of the first application and the second application that she/he wants to bilaterally share between the first and second application. In an aspect, the GUI of the operating system may display an interface over an icon of the first application and an icon of the second application for the user to select which authentication profile(s) she/he wishes to bilaterally share between the first and second applications.

In some embodiments, the action performed may not need contact with a display of the user device in the GUI. For example, augmented or virtual reality devices (e.g., glasses, head-mounted devices, body-mounted devices, and the like) may be used to receive body movement gestures. For example, body movement gestures may include hand motion. As a further example, an augmented or virtual reality device may display a virtual application display for the user and the user may move a first application toward a second application, move both the first application and second application toward each other, and/or tap both the first application and second application at the same time. Such gestures and/or actions in an augmented or virtual reality space may correspond to the request to bilaterally share authentication profiles between the applications described herein.

At block 310, the operating system obtains from the first application a first account identifier and a first encrypted identity token. Similarly, at block 340, the operating system obtains from the second application a second account identifier and a second encrypted identity token. The first account identifier may be an email address, telephone number, instant messaging handle or other identifier of authentication profiles of the first application. Similarly, the second account identifier may be an email address, telephone number, instant messaging handle or other identifier of authentication profiles of the second application. Each account identifier may be associated with a communication application such that electronic communications (e.g. messages) may be received using the account identifier. For example, the communication application may be an email application and the first or second account identifier may be an email address. As such, emails directed to an email address may be received and viewed in the email application. As another example, the communication application may be a text messaging application and the first or second account identifier may be a telephone number. As such, text messages directed to a telephone number may be received and viewed in the text messaging application. As a further example, the communication application may be an instant messaging application and the first or second account identifier may be a messenger handle, and messages directed to a messenger handle may be received and viewed in the instant messaging application.

In some embodiments, the first identity token may be an encrypted identity token generated and encrypted by the first application. Similarly, in some embodiments, the second identity token may be an encrypted identity token generated and encrypted by the second application. For example, each identity token may contain user profile information such as a user's name, birthdate, address, email, security picture, and/or other information related to authentication of the user. In various embodiments, the first application and second application provide their respective identity tokens to the operating system and the operating system encrypts the identity token for further verification in later blocks.

At block 315, the operating system verifies that it has access to a communication application associated with the first account identifier obtained in block 310. Similarly, at block 345, the operating system verifies that it has access to a communication application associated with the second account identifier obtained in block 340. For example, if an account identifier is an email address, the operating system verifies that the operating system has access to an email application associated with the email address. As another example, if an account identifier is a telephone number, the operating system verifies that the operating system has access to a text messaging application or voice calling application associated with the telephone number. In further examples, an account identifier may be a messaging handle and the operating system verifies that the operating system has access to the messaging application associated with the messaging handler. In some cases, access to the various communication applications includes the ability to request information (e.g., electronic messages and content thereof) from the communication application(s). In other cases, access to the communication application includes the ability to read, search, scan, copy, edit, delete, share, and/or create new information from, within, and/or using the communication application. In various embodiments, the user has provided access to the operating system to access the communication application upon installation of the communication application or within user preferences of the communication application.

At block 320, the operating system communicates the first account identifier and the first encrypted identity token to a second application server. Similarly, at block 350, the operating system communicates the second account identifier and the second encrypted identity token to a first application server. Although FIG. 3 is generally described in reference to a single account identifier and a single encrypted identity token with respect to an application, FIG. 3 is not limited to such as more than one account identifier and its respective encrypted identity token may be used in sharing authentication profiles between applications as each application may have multiple authentication profiles to share. For example, a user, or multiple users, may have numerous authentication profiles in the first application corresponding to the different account identifiers and the user may want to share one or more of the numerous authentication profiles from the first application to the second application and vice versa. In the above example, a user of the user device may select a number of authentication profiles that may be shared using the embodiments disclosed herein.

In some embodiments, the operating system may communicate the account identifiers and the encrypted identity tokens to the application servers via a network interface. In some cases, the operating system uses access to the one or more communication applications of the user device, described above, to communicate with servers of the applications. For example, the operating system may use the email application to send an email containing first account identifier and the first encrypted identity token to an email address controlled by a second application server. Similarly, the operating system may use the email application to send an email containing second account identifier and the second encrypted identity token to an email address controlled by a first application server. In another example, the operating system may use the text messaging application to send a text message containing the first account identifier and the first encrypted identity token to a telephone number controlled by a second application server. Similarly, the operating system may use the text messaging application to send a text message containing the second account identifier and the second encrypted identity token to a telephone number controlled by a first application server.

In various embodiments, the second application server receives the first account identifier and the first encrypted identity token from the operating system of the user device. Similarly, the first application server receives the second account identifier and the second encrypted identity token from the operating system of the user device. For example, the first application server may receive the second account identifier and the second encrypted identity token over a network channel. Likewise, the second application server may receive the first account identifier and the first encrypted identity token over a network channel. In some cases, the servers discussed above may receive the respective account identifiers and encrypted identity tokens via a communication application, such as an email application, text messaging application, and/or other network interface. In some embodiments, the account identifiers and encrypted identity tokens are received as QR codes that may be scanned by the application servers, or other QR-reading devices coupled thereto, to direct the application servers to such account identifiers and encrypted identity tokens.

Upon receiving the first account identifier and the first encrypted identity token, the second application server may communicate the first account identifier and the first encrypted identity token to a first application server in a verification request. Similarly, upon receiving the second account identifier and the second encrypted identity token, the first application server may communicate the second account identifier and the second encrypted identity token to a second application server in a verification request.

In some embodiments, the first application server may decrypt the first encrypted identity token and verify that the first account identifier and the respective information from the decrypted first identity token are valid according to account information of the user stored in a database of the first application server. Likewise, the second application server may decrypt the second encrypted identity token and verify that the second account identifier and the respective information from the decrypted second identity token are valid according to account information of the user stored in a database of the second application server.

For example, each application server may verify that account information corresponding to an account identifier matches decrypted information of the respective identity token. After account identifiers and information from the respective identity tokens have been verified by each server, the first application server may communicate to the second application server a verification message and the second application server may communicate to the first application server a verification message.

The verification messages from each server may indicate that the account identifier and the information encrypted in the identity token are valid for the user for the application associated with that server. In response to receiving the verification/confirmation communication (e.g., message, notification) from the first application server, the second application server communicates (e.g., sends) a verification/confirmation communication (e.g., message, notification) to the first account identifier (e.g., email address, telephone number, messenger handle). Similarly, in response to receiving the verification message from the second application server, the first application server communicates a verification/confirmation communication to the second account identifier (e.g., email address, telephone number, messenger handle).

At blocks 330 and 360, the operating system determines that confirmations have been received in the communication application(s) to which it has access. The operating system may determine whether the confirmation includes verification information from the second application server or first application server.

For example, the operating system may determine that the first account identifier and the first encrypted identity token that was previously sent to the second application server are contained in a first confirmation. Similarly, the operating system may determine that the second account identifier and the second encrypted identity token that were previously sent to the first application server are contained in a second confirmation. In some cases, the first confirmation may be in a communication application that is different than the communication application in which the second confirmation is received. For example, the first confirmation may be an email received in an email application while the second confirmation may be a text message received in a text messaging application.

In some embodiments, the operating system may determine that each confirmation contains the correct account identifier, encrypted identity token, and/or verification token from its respective application server. For example, the first account identifier and first identity token may be compared against what was obtained from the first application at block 310 to verify that they are correct. Likewise, the second account identifier and second identity token may be compared against what was obtained from the second application at block 340 to verify that they are correct. Additionally, verification tokens in the confirmations may be compared against verification tokens received from the first and second application servers to verify that the first and second application servers performed verification between each other.

In various embodiments, the operating systems performs searches/scans in the communication applications to find confirmation messages and analyzes the contents of the confirmation messages. In an aspect, text comparison is used to determine if the content of a confirmation message is valid.

At block 335, authentication from the first application is shared with the second application. Likewise, at block 365, authentication from the second application is shared with the first application. Authentication from the first application may be shared with the second application in response to the operating system determining that the confirmation received at block 330 contains the first account identifier, the first encrypted identity token, and/or the verification token from the second application server. The authentication from the first application may be shared with the second application further in response to the initial authentication of the user for use of the user device. Sharing authentication with the second application may authorize the user to access the second application (e.g., accounts registered thereto) using the authentication already established with first application.

Similarly, authentication from the second application may be shared with the first application in response to the operating system determining that the confirmation received at block 360 contains the second account identifier, the second encrypted identity token, and/or the verification token from the first application server. The authentication from the second application may be shared with the first application further in response to the initial authentication of the user for use of the user device. Sharing authentication with the first application may authorize the user to access the first application (e.g., accounts registered thereto) using the authentication already established with second application.

In some embodiments, after a user (or applications) has bilaterally shared authentication, a user may start (e.g., open) the second application and the second application may prompt the user for an account identifier that she/he wishes to use to authenticate herself/himself. The second application may list account identifiers that may be used as authentication profiles for the user. The list may include account identifier(s) established on the second application and account identifiers that have been shared to the second application from the first (or other) applications. For example, the user may use an email address and password to authenticate herself/himself to access the first application. After sharing authentication from the first application to the second application, the user may authenticate herself/himself to access the second application using the same email address established as part of the authentication profile of the first application. In some embodiments, the user need only provide the email address (without the password) to access the second application as both the first application server and the operating system of the user device have authenticated the user in various ways as discussed herein.

Similarly, in some embodiments, after a user (or applications) has bilaterally shared authentication, a user may start (e.g., open) the first application and the first application may prompt the user for an account identifier to authenticate herself/himself. The first application may list account identifiers that may be used as authentication profiles for the user. The list may include account identifier(s) established on the first application and account identifier(s) that have been shared to the first application from the second (or other) applications. For example, the user may use a telephone number and password to authenticate herself/himself to access the second application. However, after sharing authentication from the second application to the first application, the user may authenticate herself/himself to access the first application using the same telephone number established as part of the authentication profile of the second application. In some embodiments, the user need only provide the telephone number (without the associated password) to access the first application as both the second application server and the operating system of the user device have authenticated the user in various ways as discussed herein, which may be the basis for each instance of authentication using the telephone number to access the first application.

Figure 4:
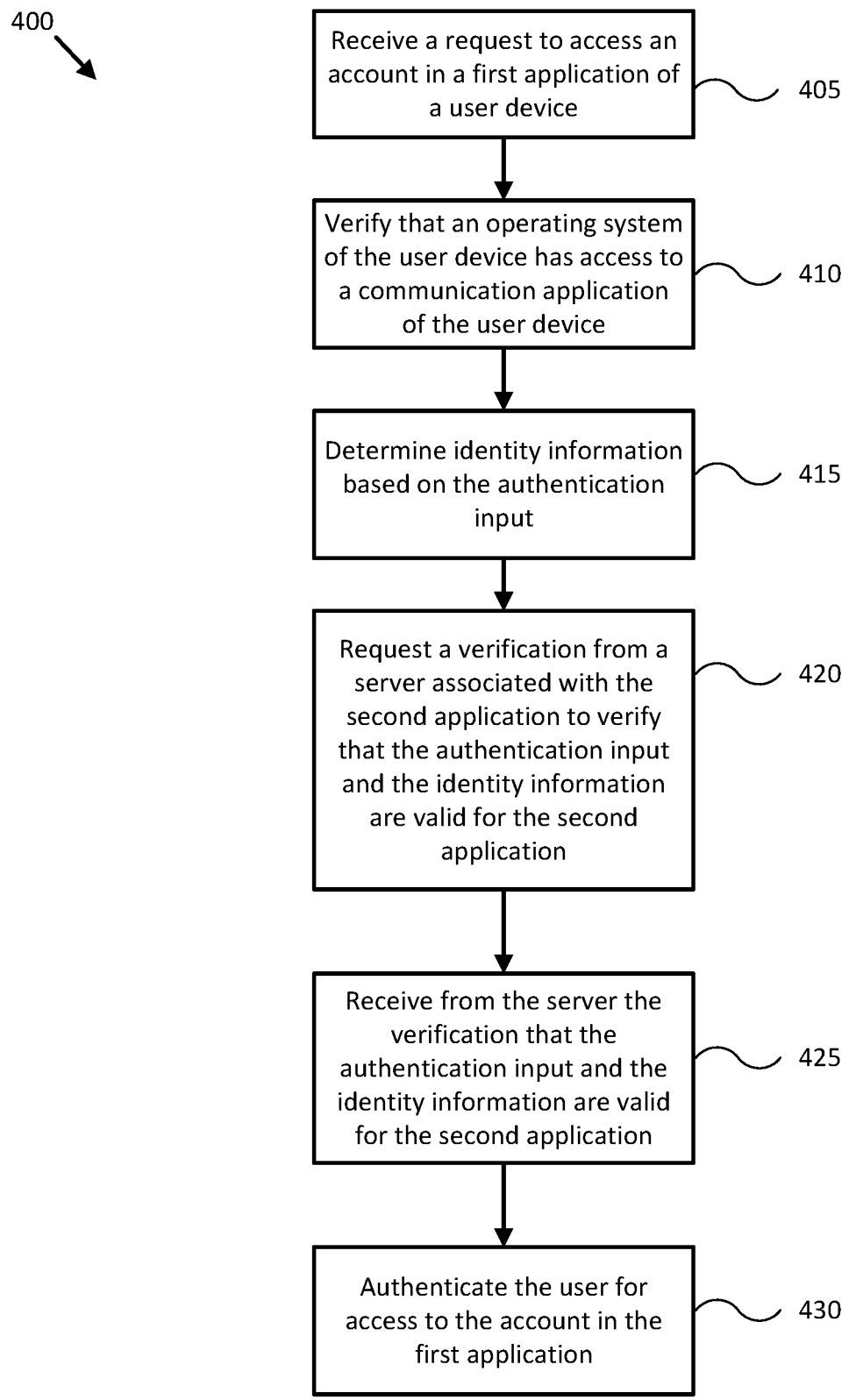
FIG. 4 illustrates is a flow diagram of a process for authenticating a user after one or more authentication profiles have been shared between applications in accordance with one or more embodiments of the present disclosure.

FIG. 4 illustrates a flow diagram of a process 400 for authenticating a user after one or more authentication profiles have been shared between applications in accordance with one or more embodiments of the present disclosure. For explanatory purposes, process 400 is primarily described herein with reference to FIGS. 2 and 3; however, the process 400 is not limited to FIGS. 2 and 3. The blocks of process 400 are described herein as occurring in serial, or linearly (e.g., one after another). However, multiple blocks of process 400 may occur in parallel. In addition, the blocks of process 400 need not be performed in the order shown and/or one or more of the blocks of process 400 need not be performed.

In some embodiments, a user may want to use a shared authentication profile from a first application as an authentication input to authenticate herself/himself for access to a second application. As such, at block 405, the second application receives a request to access the second application (or an account of the second application) of a user device. The request may include an authentication input indicating that the shared authentication profile is to be used for the second application. For example, the user may select an account identifier such as an email address or telephone number that she/he wants to use in authenticating herself/himself for the second application. The account identifier may have been previously established as an account identifier for the first application.

At block 410, in response to receiving the request to use the shared authentication profile to access the second application, the second application may verify that the operating system has access to a communication application associated with the account identifier of the shared authentication profile. For example, if the account identifier of the shared authentication profile is an email address, the second application verifies that the operating system has access to an email application that receives emails for the email address. As another example, if the account identifier of the shared authentication profile is a telephone number, the second application verifies that the operating system has access to a text messaging application that receives text messages for the telephone number. As a further example, if the account identifier of the shared authentication is messenger handle, the second application verifies that the operating system has access to a messenger application that receives messages for the messenger handle. In some embodiments, the second application verifies that the operating system has access to the appropriate communication application by making a request to the operating system to verify such. The operating system may verify that it has access to the appropriate communication application. Accordingly, the second application may receive a verification notification from the operating system indicating that the operating system has access to the appropriate communication application associated with the account identifier.

At block 415, the second application determines identity information of the user based on the account identifier provided as authentication input. For example, the second application may communicate with a second application server to determine the identity information. The second application server may have stored identity information in a database. In an aspect, the identity information of the user may have been stored in the database during the process to share authentication from the first application to the second application.

At block 420, the second application requests from a first application server to verify that the account identifier and identity information determined at block 415 are still valid for an account associated with the first application. For example, the second application may communicate to the second application server such that the second application server makes the verification request to the first application server. In some embodiments, the first application server may determine that the first application has been uninstalled on the user device. If the first application server determines that the first application has been uninstalled on the user device, the first application server may notify the second application server of such. In response to the notification that the first application server has been uninstalled, the second application server may cause the second application to provide a notification (e.g., pop-up message or other indication) on the display of the user device, or in a GUI of the second application. The notification may contain an indication for the user to reverify authenticity by installing the first application again and authenticating herself/himself using the account identifier and associated password for the first application. In some embodiments, the user may not need to re-install the first application. If the user does not re-install the first application, the process may proceed to block 425, however, the user may be given limited access to resources of the second application. For example, the user, after sharing authentication with the second application, may be limited to read-only mode in the second application.

At block 425, the second application server receives a verification from the first application server that the account identifier and identity information for the user are still valid for the first application. Receiving the verification from the first application confirms to the second application that the user is still authenticated for the first application, and thus, the shared authentication from the first application is still valid. Since the shared authentication has been confirmed to still be valid for the first application, at block 430, the second application may authenticate the user for access to the second application using the shared authentication from the first application.

Figure 5A:
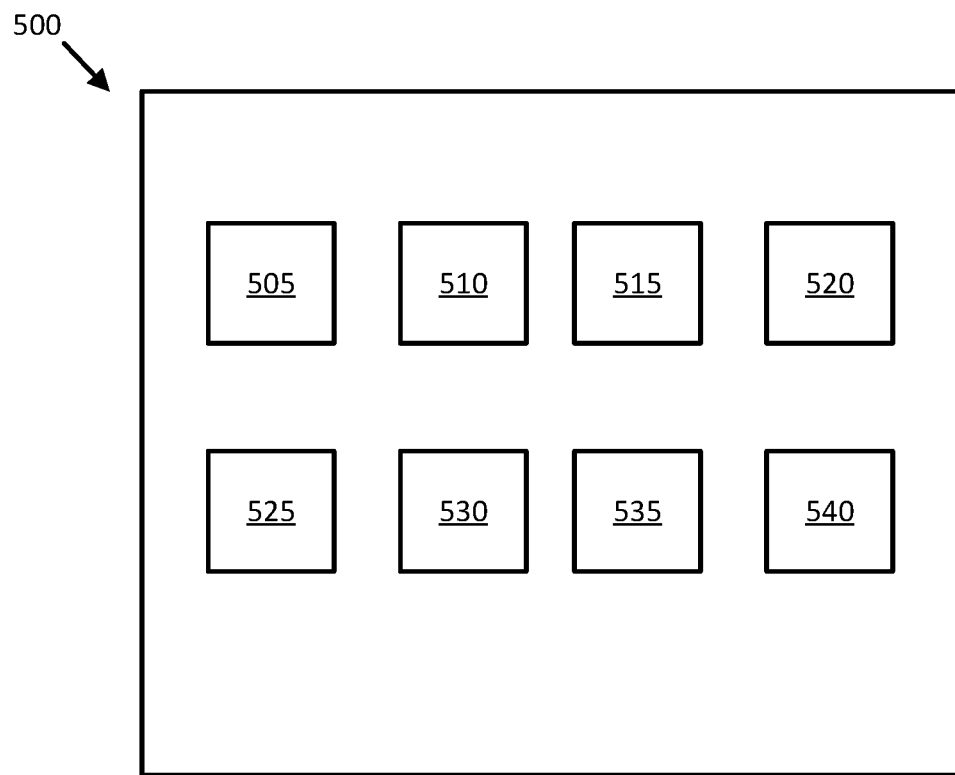
FIG. 5A illustrates a user interface of a user device in accordance with one or more embodiments of the present disclosure.
Figure 5B:
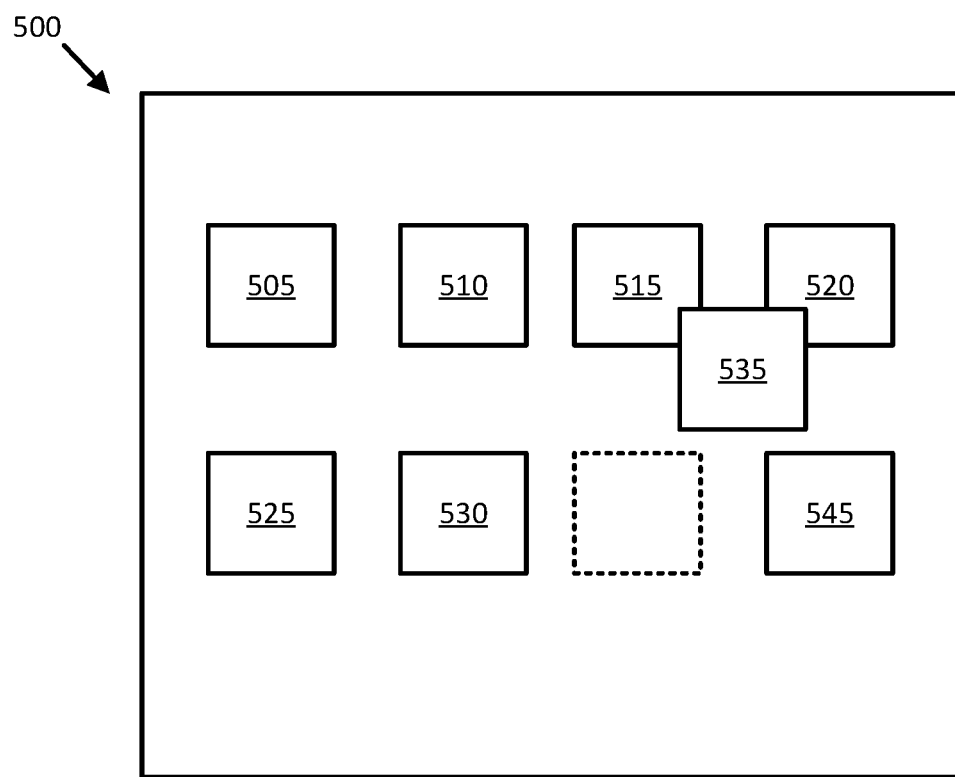
FIG. 5B illustrates an action performed in the user interface of FIG. 5A in accordance with one or more embodiments of the present disclosure.

FIG. 5A is an illustration of a user interface 500 of a user device in accordance with one or more embodiments of the present disclosure. User interface 500 includes application icons 505, 510, 515, 520, 525, 530, 535, and 540, which correspond to different applications on the user device. For example, the user device may be, may include, or may be part of user device 110 of FIG. 1. Application icons may be moved and/or arranged in the user interface, where some movements, arrangements, and/or rearrangements may cause an operating system of the user device to initiate sharing authentication between applications as described in the present disclosure. FIG. 5B illustrates an action performed in user interface 500 that initiates authentication sharing between applications. As shown in FIG. 5B, application icon 535 is moved toward application icon 520 such that it overlaps application icon 520. This action may correspond to a request to share authentication of a first application associated with application icon 535 with a second application that is associated with application icon 520. In some cases, the application icons need not overlap as shown, but may be moved to be within a predetermined distance (e.g., pixels) of each other to initiate an authentication sharing process as described herein (e.g., process 200 of FIG. 2 or process 300 of FIG. 3). Before the authentication sharing process is performed, the operating system may request a confirmation of the request, such as through a pop-up message, a text message, a phone call, an email, or other means to receive a confirmation or a denial/cancellation.

Figure 5C:
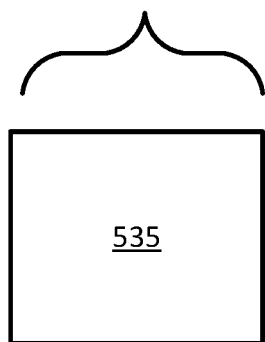
FIG. 5C illustrates account identifiers corresponding to applications before authentication is shared between the applications in accordance with one or more embodiments of the present disclosure.
Figure 5C:
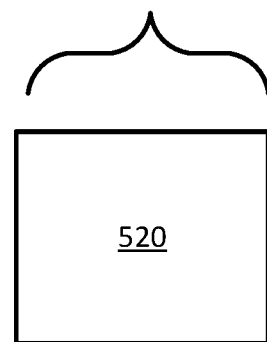
Figure 5D:
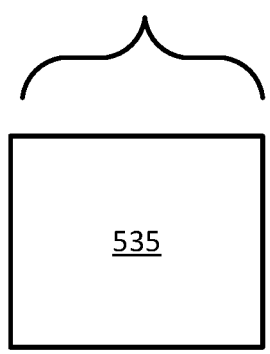
FIG. 5D illustrates a result after authentication is shared between applications in accordance with one or more embodiments of the present disclosure.
Figure 5D:
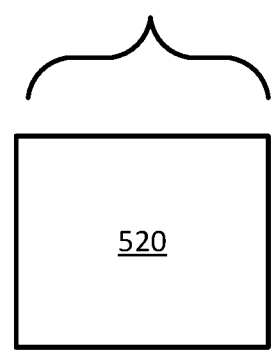

FIG. 5C is an illustration of account identifiers corresponding to applications before authentication is shared between applications in accordance with one or more embodiments of the present disclosure. A first application associated with application icon 535 has email addresses "johndoe@email.com" and "janedoe@email.com" as account identifiers. A user may use these email addresses in authentication for the first application. A second application associated with application icon 520 has a telephone number as an account identifier. A user may use the telephone number in authentication of the second application. After a user has performed an action in the user interface to request that authentication be shared from the first application to the second application, for example, as shown in FIG. 5B, authentication from the first application is shared with the second application. FIG. 5D illustrates a result after authentication from the first application has been shared with the second application. As shown in FIG. 5D, the account identifiers of the first application have been shared with the second application such that the user may access the second application using the account identifiers "johndoe@email.com" and "janedoe@email.com." In this case, authentication has been shared one way, however, in various embodiments, authentication may be shared bilaterally as described herein. It is noted that the user may still use the original authentication profiles of the first application to access the first application.

Figure 6A:
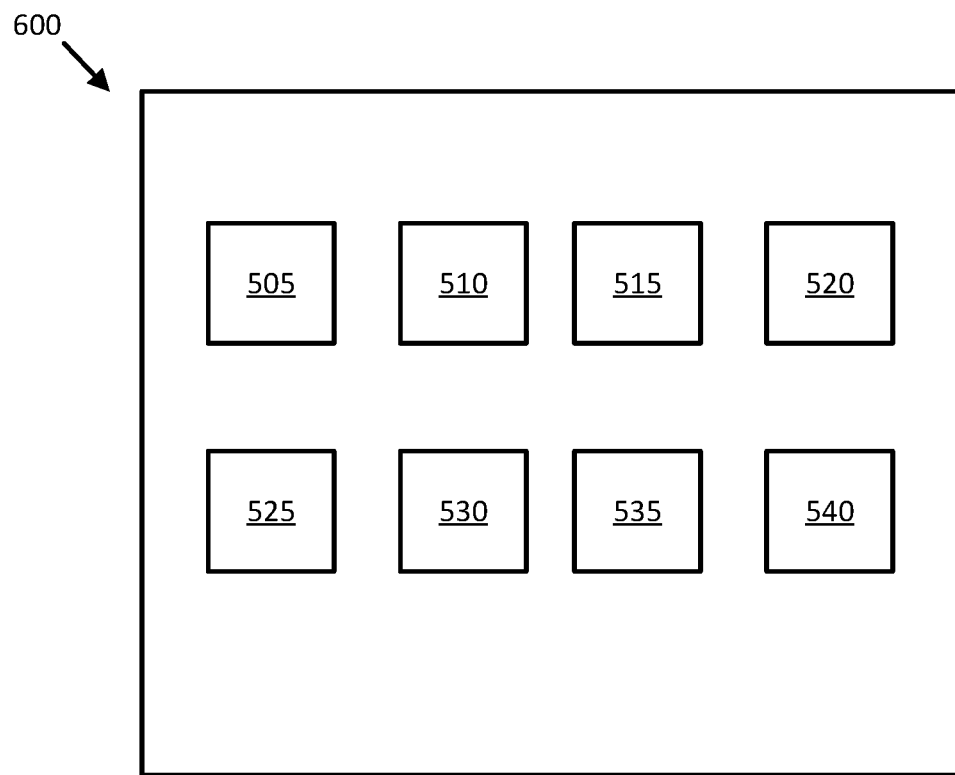
FIG. 6A illustrates a user interface of a user device in accordance with one or more embodiments of the present disclosure.
Figure 6B:
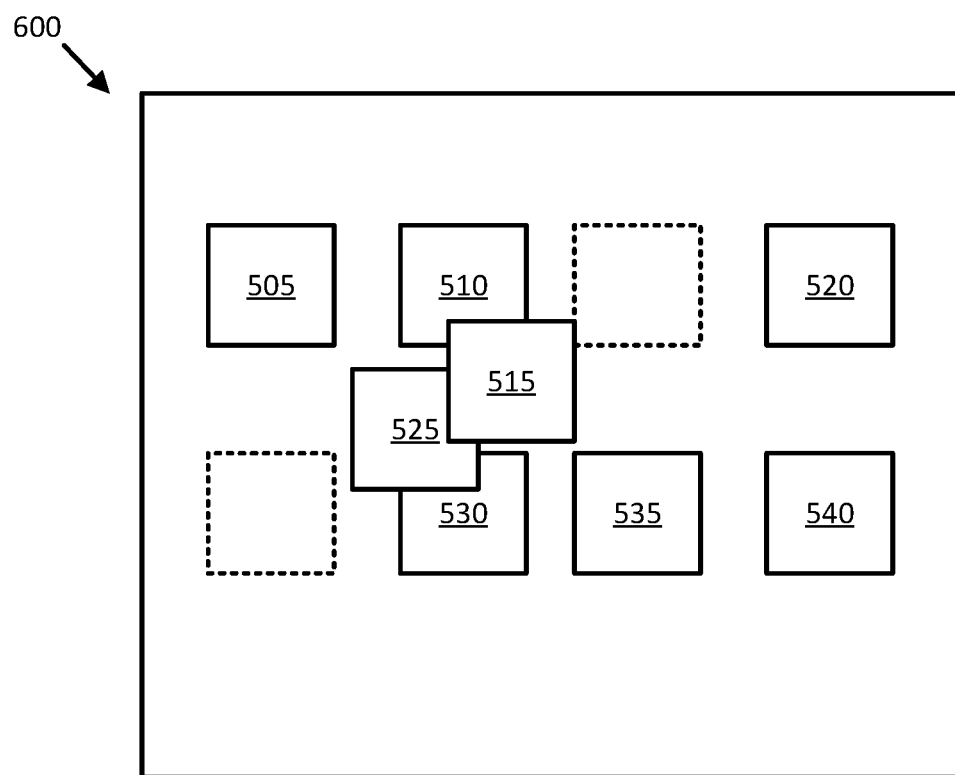
FIG. 6B illustrates an action performed in the user interface of FIG. 6A in accordance with one or more embodiments of the present disclosure.

FIG. 6A is an illustration of a user interface 600 of a user device in accordance with one or more embodiments of the present disclosure. User interface 600 includes application icons 505, 510, 515, 520, 525, 530, 535, and 540, which correspond to different applications on the user device. For example, the user device may be, may include, or may be part of user device 110 of FIG. 1. Application icons may be moved and/or arranged in the user interface, where some movements and/or arrangements may cause an operating system of the user device to initiate bilaterally sharing authentication between applications as described in the present disclosure. FIG. 6B illustrates an action performed in user interface 600 that initiates bilateral authentication sharing between applications. As shown in FIG. 6B, application icon 525 is moved toward application icon 515 such that there is an overlap between application icons 525 and 515. An operating system of the user device may determine that this action corresponds to a request to bilaterally share authentication between a first application associated with application icon 525 and a second application associated with application icon 515. In some cases, the application icons need not overlap as shown, but may be moved to be within a predetermined distance (e.g., pixels) of each other to initiate a bilateral authentication sharing process as described herein (e.g., process 300 of FIG. 3). As with the above example, before the authentication sharing proceeds further, the operating system may request a confirmation of the request, such as through a pop-up message, a text message, a phone call, an email, or other means to receive a confirmation or a denial/cancellation.

Figure 6C:
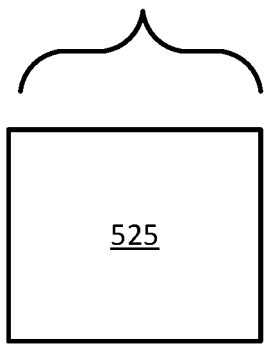
FIG. 6C illustrates account identifiers corresponding to applications before authentication is bilaterally shared between applications in accordance with one or more embodiments of the present disclosure.
Figure 6C:
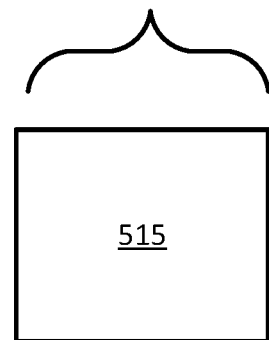
Figure 6D:
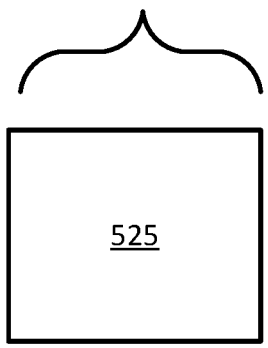
FIG. 6D illustrates a result after authentication is bilaterally shared between applications in accordance with one or more embodiments of the present disclosure.
Figure 6D:
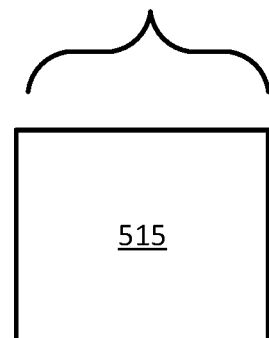

FIG. 6C is an illustration of account identifiers corresponding to applications before authentication is bilaterally shared between applications in accordance with one or more embodiments of the present disclosure. A first application associated with application icon 525 has email addresses "johndoe@email.com" and "janedoe@email.com" as account identifiers. A user may use these email addresses in authentication for the first application. A second application associated with application icon 515 has a telephone number as an account identifier. A user may use the telephone number in authentication for the second application. After a user has performed an action in the user interface (e.g., moving icons to positions as shown in FIG. 6B), and the action is determined to correspond to a request for authentication to be bilaterally shared between the first application and the second application, authentication will be bilaterally shared between the first application and the second application. FIG. 6D illustrates a result after authentication has been bilaterally shared between the first application and the second application. As shown in FIG. 6D, the account identifiers of the first application have been shared with the second application such that the user may access the second application using the account identifiers: telephone number, "johndoe@email.com", and "janedoe@email.com." Because bilateral authentication sharing is performed, the account identifiers of the second application are shared with the first application such that the user may access the first application using the same account identifiers as the second application: telephone number, "johndoe@email.com", and "janedoe@email.com."

In some embodiments, after bilaterally sharing authentication, a user may open the application to which an authentication profile(s) has been shared and the application may prompt the user for an account identifier to authenticate herself/himself. The application may list account identifiers that may be used as authentication profiles for the user. Shared authentication profiles may have restricted access to resources of the first application. For example, user preferences of the first application may restrict shared authentication profiles to read-only mode. In some cases, user preferences for certain authentication profiles that have been shared may be configured to adjust access to the application. For example, a user may adjust preferences for a shared authentication profile such that the shared authentication profile has unlimited access to the application and accounts thereof. As an illustration, a user may share an authentication profile of her spouse from a first application to a banking application. The user may restrict the spouse to limited access of the banking application when the spouse uses the authentication profile to access the banking application (e.g., access limited to viewing account balances).

Figure 7:
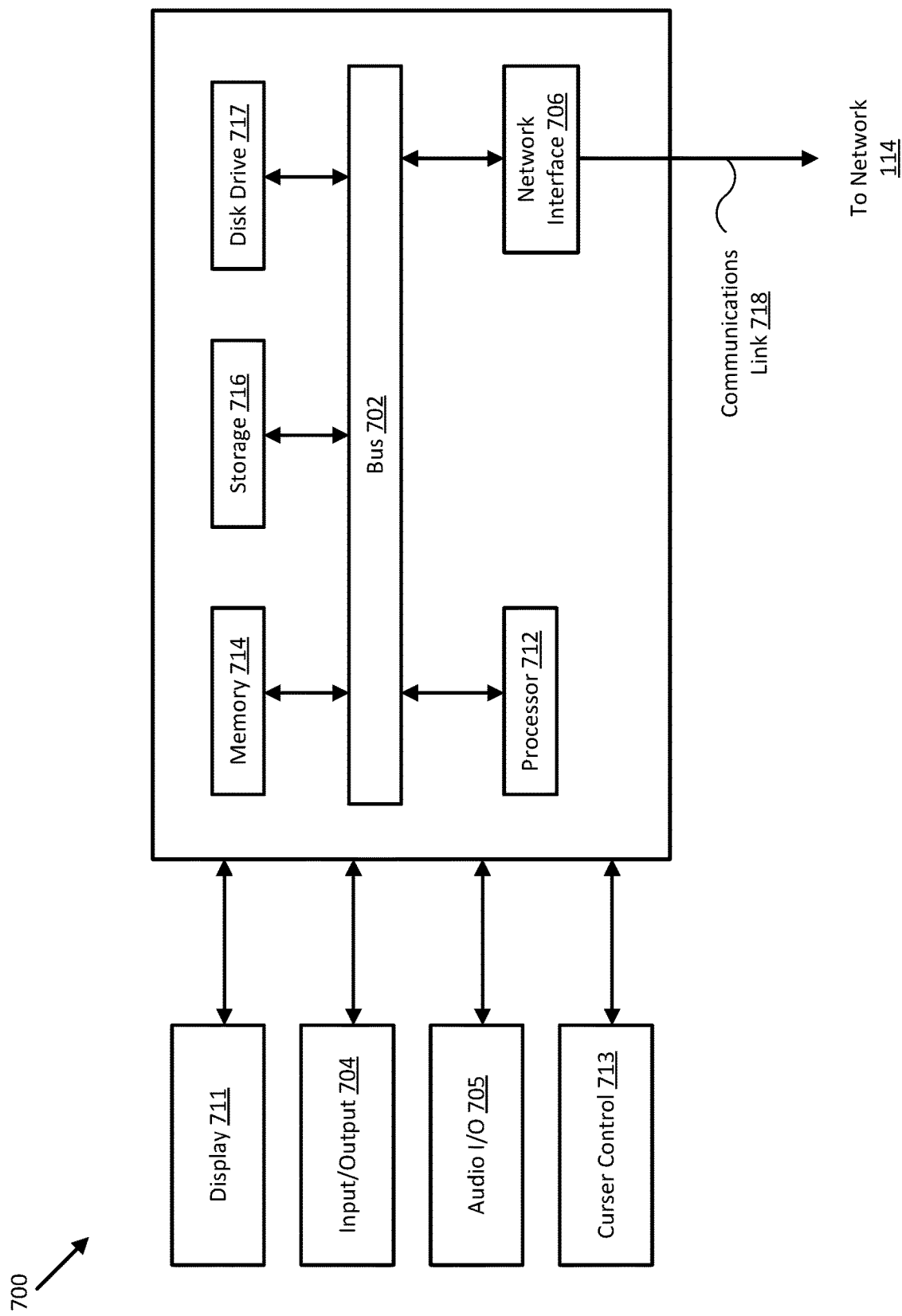
FIG. 7 illustrates a block diagram of a computer system in accordance with one or more embodiments of the present disclosure.

FIG. 7 illustrates a block diagram of a computer system 700 suitable for implementing one or more embodiments of the present disclosure. In various implementations, a user device may comprise a personal computing device (e.g., a personal computer, laptop, smart phone, PDA, Bluetooth device, key FOB, badge, etc.) capable of communicating with the network. The entity and service provider discussed in reference to FIG. 4 may utilize a network computing device (e.g., a network server) capable of communicating with the network 114 of FIG. 1. It should be appreciated that each of the devices utilized by users, entities, and service providers, and payment networks discussed herein may be implemented as computer system 700 in a manner as follows.

Computer system 700 includes a bus 702 or other communication mechanism for communicating information data, signals, and information between various components of computer system 700. Components include an input/output (I/O) component 704 that processes a user action, such as selecting keys from a keypad/keyboard, selecting one or more buttons or links, etc., and sends a corresponding signal to bus 702. I/O component 704 may also include an output component, such as a display 711 and a cursor control 713 (such as a keyboard, keypad, mouse, etc.). I/O component 704 may further include NFC communication capabilities, such as an NFC reader to allow NFC communication with other devices as discussed herein. An optional audio input/output component 705 may also be included to allow a user to use voice for inputting information by converting audio signals. Audio I/O component 705 may allow the user to hear audio. A transceiver or network interface 706 transmits and receives signals between computer system 700 and other devices, such as another user device, an entity server, and/or a provider server via network 114. In one embodiment, the transmission is wireless, although other transmission mediums and methods may also be suitable. Processor 712, which may be one or more hardware processors, can be a micro-controller, digital signal processor (DSP), or other processing component, processes these various signals, such as for display on computer system 700 or transmission to other devices via a communication link 718. Processor 712 may also control transmission of information, such as cookies or IP addresses, to other devices.

Components of computer system 700 also include a system memory component 714 (e.g., RAM), a static storage component 716 (e.g., ROM), and/or a disk drive 717. Computer system 700 performs specific operations by processor 712 and other components by executing one or more sequences of instructions contained in system memory component 714. Logic may be encoded in a computer-readable medium, which may refer to any medium that participates in providing instructions to processor 712 for execution. Such a medium may take many forms, including but not limited to, non-volatile media, volatile media, and transmission media. In various implementations, non-volatile media includes optical or magnetic disks, volatile media includes dynamic memory, such as system memory component 714, and transmission media includes coaxial cables, copper wire, and fiber optics, including wires that comprise bus 702. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 700. In various other embodiments of the present disclosure, a plurality of computer systems 700 coupled by communication link 718 to the network 114 (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure.

What is claimed is:

1. A system, comprising:
a non-transitory memory; and
one or more hardware processors coupled to the non-transitory memory and configured to read instructions from the non-transitory memory to cause the system to perform operations comprising:
determining that an action performed on a user device matches a predetermined action corresponding to a request to share an authentication of a user for a first application with a second application, wherein the predetermined action comprises a movement of an icon of the first application toward an icon of the second application in a user interface of the user device;
obtaining from the first application an account identifier associated with the authentication and an identity token corresponding to an account of the user for the first application;
verifying that access to electronic communications associated with the account identifier is available on a third application;
in response to the verifying, sending the account identifier and the identity token to a server associated with the second application;
scanning the electronic communications in the third application for a confirmation from the server;
determining that the confirmation contains the account identifier and the identity token; and
sharing the authentication with the second application, wherein the sharing the authentication authorizes the user to access the second application using the authentication of the user for the first application.

2. The system of claim 1, wherein the predetermined action further comprises a selection of an option, in a graphical user interface of the first application, to share the authentication with the second application.

3. The system of claim 1, wherein the account identifier is an email address or telephone number, and wherein the third application is an email application associated with the email address or a text messaging application associated with the telephone number.

4. The system of claim 1, wherein the operations further comprise:
authenticating the user for access to the user device, wherein the sharing the authentication with the second application is performed, at least in part, in response to the authenticating the user for access to the user device.

5. The system of claim 1, wherein the operations further comprise:
authenticating the user for access to the user device, wherein the sharing the authentication with the second application is performed in response to the authenticating the user and the determining that the confirmation contains the account identifier and the identity token.

6. A method comprising:
   determining that an action performed on a user device matches a predetermined action corresponding to a request to share a first authentication of a user for a first application with a second application, wherein the predetermined action comprises a movement of an icon of the first application toward an icon of the second application in a user interface of the user device;
   obtaining from the first application a first account identifier associated with the first authentication and a first identity token corresponding to a first account of the user for the first application;
   verifying that access to electronic communications associated with the first account identifier is available on a third application;
   in response to the verifying, communicating the first account identifier and the first identity token to a second server associated with the second application;
   scanning the electronic communications in the third application for a verification communication from the second server;
   determining that the verification communication from the second server contains the first account identifier and the first identity token; and
   sharing the first authentication with the second application, wherein the sharing the first authentication authorizes the user to access the second application using the first authentication.

7. The method of claim 6, further comprising:
   receiving a request to share a second authentication of the user for the second application with the first application;
   obtaining from the second application a second account identifier associated with the second authentication and a second identity token corresponding to a second account of the user for the second application;
   verifying that access to electronic communications associated with the second account identifier is available on a fourth application;
   in response to the verifying, communicating the second account identifier and the second identity token to a first server associated with the first application;
   scanning the electronic communications in the fourth application for a verification communication from the first server;
   determining that the verification communication from the first server contains the second account identifier and the second identity token; and
   sharing the second authentication with the first application, wherein the sharing the second authentication permits the user to access the first application using the second authentication.

8. The method of claim 7, further comprising:
   determining that the action performed on the user device further matches a predetermined action corresponding to the request to share the second authentication.

9. The method of claim 8, wherein the action performed on the user device comprises a first movement of a first icon of the first application toward a second icon of the second application and a second movement of the second icon toward the first icon, and wherein the first movement and second movement are concurrent.

10. The method of claim 7, wherein the first account identifier is an email address, wherein the third application is an email application, wherein the second account identifier is a telephone number, and wherein the fourth application is a text messaging application associated with the telephone number.

11. The method of claim 7, wherein the first account identifier is a first email address, wherein the second account identifier is a second email address, wherein the third application is an email application, and wherein the fourth application is the third application.

12. The method of claim 6, wherein the request to share the first authentication includes first account information of a first account associated with the first application, and wherein the sharing the first authentication with the second application further authorizes fund transfers between the first account and a second account associated with the second application.

13. A non-transitory machine-readable medium having stored thereon machine-readable instructions executable to cause a machine to perform operations comprising:
   determining that an action performed on a user device matches a predetermined action corresponding to a request to share an authentication of a user for a first application with a second application, wherein the predetermined action comprises a movement of an icon of the first application toward an icon of the second application in a user interface of the user device;
   in response to the movement of the icon of the first application toward the icon of the second application, sharing the authentication with the second application, wherein the sharing the authentication authorizes the user to access the second application using the authentication of the user for the first application;
   receiving a request from the user to access an account in the second application of a user device, wherein the request includes an authentication input corresponding to the first application of the user device;
   verifying that an operating system of the user device has access to a communication application of the user device, wherein the authentication input is associated with the communication application;
   determining identity information based on the authentication input;
   requesting a verification from a server associated with the first application to verify that the authentication input and the identity information are valid for the first application;
   receiving, from the server, the verification that the authentication input and the identity information are valid for the first application; and
   in response to the verifying that the operating system of the user device has access to the communication application and the receiving, from the server, the verification that the authentication input and the identity information are valid for the first application, authenticating the user for access to the account of the second application.

14. The non-transitory machine-readable medium of claim 13, wherein the authentication input is an email address, and wherein the communication application is an email application of the user device.

15. The non-transitory machine-readable medium of claim 13, wherein the authentication input is a telephone number, and wherein the communication application is a text messaging application of the user device.

16. The non-transitory machine-readable medium of claim 13, wherein the operations further comprise:

determining that the user has been authenticated to access the user device, wherein the authenticating the user for an access to the account of the second application is performed further in response to the determining that the user has been authenticated to access the user device.

17. The non-transitory machine-readable medium of claim 13, wherein the identity information comprises an encrypted identity token.

18. The non-transitory machine-readable medium of claim 13, wherein the operations further comprise determining that the first application is currently installed on the user device, and wherein the authenticating the user for an access to the account of the second application is performed further in response to the determining that the first application is currently installed on the user device.

19. The non-transitory machine-readable medium of claim 13, wherein the movement of the icon of the first application toward the icon of the second application is in a home screen for the user interface of the user device.

20. The non-transitory machine-readable medium of claim 13, wherein the authentication input comprises a biometric authentication input for the user.

* * * * *